(12) United States Patent
Sanson

(10) Patent No.: US 9,784,612 B2
(45) Date of Patent: Oct. 10, 2017

(54) DEVICE FOR DETECTING ELECTROMAGNETIC RADIATION

(71) Applicant: SOCIÉTÉ FRANÇAISE DE DÉTECTEURS INFRAROUGES—SOFRADIR, Châtenay Malabry (FR)

(72) Inventor: Eric Sanson, Grenoble (FR)

(73) Assignee: SOCIETE FRANCAISE DE DETECTEURS INFRAROUGES-SOFRADIR, Palaiseau (FR)

( * ) Notice: Subject to any disclaimer, the term of this patent is extended or adjusted under 35 U.S.C. 154(b) by 222 days.

(21) Appl. No.: 14/770,688

(22) PCT Filed: Feb. 26, 2014

(86) PCT No.: PCT/FR2014/000047
§ 371 (c)(1),
(2) Date: Aug. 26, 2015

(87) PCT Pub. No.: WO2014/131953
PCT Pub. Date: Sep. 4, 2014

(65) Prior Publication Data
US 2016/0003674 A1  Jan. 7, 2016

(30) Foreign Application Priority Data
Feb. 26, 2013  (FR) ...................... 13 00442

(51) Int. Cl.
*H01J 40/14*  (2006.01)
*G01J 1/46*  (2006.01)
*G01J 1/44*  (2006.01)

(52) U.S. Cl.
CPC ......... *G01J 1/46* (2013.01); *G01J 2001/4466* (2013.01)

(58) Field of Classification Search
CPC .... H01L 31/107; H01L 31/02027; G01J 1/46; G01J 2001/4466
See application file for complete search history.

(56) References Cited

U.S. PATENT DOCUMENTS 7,859,486 B2 * 12/2010 Kwon ................... G01J 1/4204
345/204
2012/0132789 A1  5/2012 Ricard et al.

FOREIGN PATENT DOCUMENTS

| EP | 2458849 A1 | 5/2012 |
| FR | 2857545 A1 | 1/2005 |
| WO | 2009/059015 A2 | 5/2009 |

OTHER PUBLICATIONS

May 9, 2014 International Search Report issued in International Patent Application No. PCT/FR2014/000047.
(Continued)

*Primary Examiner* — Thanh Luu
(74) *Attorney, Agent, or Firm* — Oliff PLC

(57) ABSTRACT

An electromagnetic radiation detection circuit includes a photodetector transforming the received electromagnetic radiation into an electric current. A readout circuit is coupled to a first terminal of the photodetector and configured to transform a current signal into a voltage signal. A capacitor has a first terminal electrically coupled to the first terminal of the photodetector and a second terminal electrically coupled to the readout circuit. A resistor has a first terminal electrically coupled to the capacitor and to a first terminal of the photodetector. A bias circuit is electrically coupled to a second terminal of the resistor and configured to bias the photodetector during a first time period by means of the resistor.

13 Claims, 2 Drawing Sheets

(56) References Cited

OTHER PUBLICATIONS

May 9, 2014 Written Opinion issued in International Patent Application No. PCT/FR2014/000047.

* cited by examiner

DEVICE FOR DETECTING ELECTROMAGNETIC RADIATION

BACKGROUND OF THE INVENTION

The invention relates to an electromagnetic radiation detection device.

STATE OF THE ART

Electromagnetic radiation detection devices can be used for observation of a scene emitting very little light.

Management of a very weak luminous signal during a more or less short period imposes numerous technical constraints on the detection circuit. In conventional manner, detection of a weak luminous flux and retranscription of the latter into a usable electric current are associated with the use of avalanche photodiodes. Avalanche photodiodes are strongly biased, i.e. above the avalanche voltage which enables a high electric current to be generated when a first luminous photon is detected. Once the avalanche has been established, the bias is reduced and it is necessary to wait for a certain time to deactivate the avalanche.

A large constraint therefore exists on the associated readout circuit which has to be able to withstand high bias voltages and current peaks at each light radiation detection. In a large number of configurations, a detection device with avalanche photodiodes is not usable for detection of photons emitted with a short interval. Indeed, on detection of the first photon, triggering of the avalanche and production of an intense electric current take place. When flow of the current takes place, electric charges are trapped in the different layers of electrically insulating materials which form the photodiode temporarily disturbing the operating characteristics of the photodiode for detection of the forthcoming photons.

This is why detection devices using avalanche photodiodes are slow recovery devices. It is necessary to passivate the trapped charges in order to have repeatable measurements.

In order to limit trapping of the electric charges in the photodiode, the photodiode can be made to operate slightly below the avalanche threshold. Under these conditions, there is no avalanche triggering. In this configuration, the photodiode presents a detection gain which is defined by the applied bias. The set of applied voltages enables the conversion efficiency of the photodiode to be defined. In this case, there is also biasing of the photodiode with high voltages. Large constraints exist on the readout circuit to be able to increase the sensitivity of the circuit and to improve the photon detection threshold.

In this configuration, it is also necessary to provide a readout circuit which is able to withstand high bias voltages and to manage a high current flow. However, in general manner, the high voltage applied on the photodetector to achieve a gain in sensitivity detection results in technological choices and is therefore expressed by the maximum acceptable voltage limit. For a given readout circuit technology, a trade-off has to be found between the sensitivity of the electronic circuit and the resistance to high voltages and to high currents. Consequently a readout circuit configured to be sensitive in photon detection will be greatly disturbed by high electric currents.

The document FR 2857545 describes several embodiments of a detection device. The photodetector is connected on the one hand to a readout circuit which stores the charges emitted by the photodetector and on the other hand to a bias circuit by means of a resistor. However, this resistor is a discrete resistor connected to the readout circuit which is not optimal. As indicated in the document D1, this configuration does not enable a compact device to be formed and integration of a possible integrated resistor is also indicated as being incompatible with standard compactness requirements. The document FR 2857545 proposes to replace this discrete resistor by a diode-connected MOS transistor.

Tests have shown that this configuration is incompatible with detection of signals of weak intensity.

For detection of signals of weak intensity, a partial solution is proposed in the document WO2009/059015 which provides fitting of a fuse between the photodetector and the readout circuit. The readout circuit is standard and the fuse is configured so that it cuts out when the current emitted by the photodetector exceeds a threshold. It is observed that this solution prevents a too high current from being applied from the photodetector to the readout circuit. However, this approach is expensive and requires the integration of additional technological steps.

OBJECT OF THE INVENTION

It is observed that a requirement exists to provide a detection device that is able to perform better management of a strongly biased photodetector connected to a readout circuit.

This requirement tends to be met by means of a device which comprises:
- a photodetector transforming the received electromagnetic radiation into an electric current,
- a readout circuit coupled to a first terminal of the photodetector, the readout circuit being configured to transform a current signal emitted by the photodetector into a voltage signal,
- a capacitor having a first terminal electrically coupled to the first terminal of the photodetector and a second terminal electrically coupled to the readout circuit,
- a bias circuit configured to bias the photodetector during a first time period by means of a first biasing condition, the bias circuit being configured to leave the first terminal of the photodetector at a floating potential in a second time period, the first biasing condition being configured to make the photodetector operate in linear avalanche manner during the second time period,
- a resistor having a first terminal electrically coupled to the bias circuit and a second terminal electrically coupled to the first terminal of the photodetector.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PREFERRED EMBODIMENTS OF THE INVENTION

Figure 1:
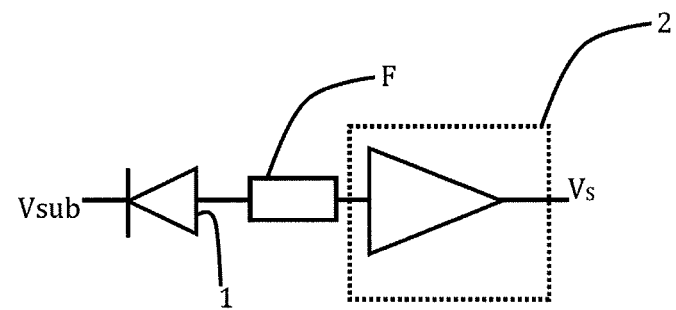
FIG. 1 represents a detection circuit according to the prior art, in schematic manner.
Figure 2:
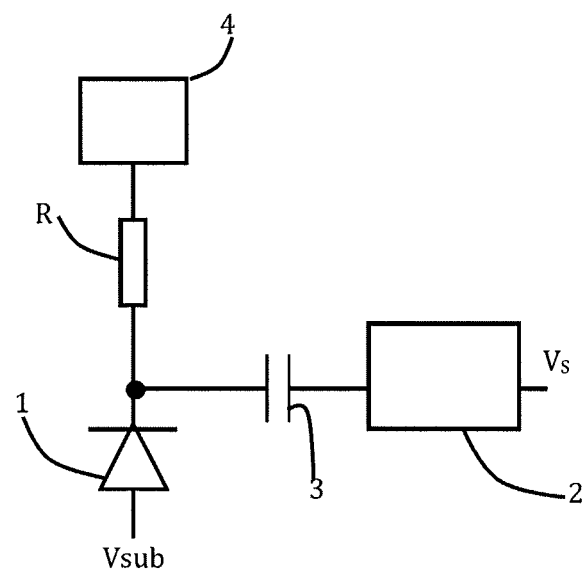
FIG. 2 represents an embodiment of a detection circuit according to the invention, in schematic manner.

As illustrated in FIG. 2, the detection device comprises a photodetector 1 schematized in the form of a current source and able to convert the received light signal into an electric signal. Photodetector 1 is configured to detect an electromagnetic radiation in a precise wavelength range.

Photodetector 1 can be formed by any suitable device, for example by a photodiode or by a quantum well or multi-quantum well device. The photodetector is a device biased with a first voltage range to deliver information representative of the observed scene. The photodetector is advantageously configured to detect an infrared radiation, preferably a particular range of the infrared radiation, for example the LWIR, MWIR or SWIR ranges.

Photodetector 1 has a first terminal electrically coupled to a readout circuit 2. Readout circuit 2 is configured to transform a current signal transmitted to an input terminal into a voltage signal $V_S$ on its output terminal.

A capacitor 3 is connected between the first terminal of photodetector 1 and the input terminal of readout circuit 2. Readout circuit 2 imposes a readout voltage on capacitor 3. Capacitor 3 prevents the potential present on photodetector 1 from reaching readout circuit 2 directly. The same is the case for the potential applied by readout circuit 2.

The detection device also comprises a bias circuit 4 configured to bias photodetector 1. Bias circuit 4 is configured in such a way that photodetector 1 acts as a current source with a current intensity that is a function of the electromagnetic radiation received. The detection device is configured to detect a signal of very weak intensity.

Bias circuit 4 is configured to bias photodetector 1 in its desired operating mode. As bias circuit 4 is electrically coupled to photodetector 1, it is configured so as not to completely absorb the emitted electric signal, but advantageously to absorb the emitted signal periodically. Bias circuit 4 and readout circuit 2 are connected or coupled to photodetector 1 so as to define two distinct flow paths of the current emitted by photodetector 1.

In a particular embodiment, the biasing conditions are configured to place photodetector 1 above the avalanche threshold or slightly below the avalanche threshold (in absolute value) to have a linear avalanche detector. In this operating range, each photon received generates a predefined quantity of electrons. This quantity of electrons is defined by the biasing conditions of the photodetector. In this way, detection of a photon generates a fixed electron value and detection of two photons generates a value that is twice that of detection of a single photon.

For example, for a photodiode made from HgCdTe configured for detection of a radiation in the SWIR range, it is possible to reverse bias the diode between 8 and 20V to obtain a gain ranging from 5 to 100. For a photodiode made from HgCdTe configured for detection of a radiation in the MWIR range, it is possible to reverse-bias the diode between 3 and 10V to obtain a gain ranging from 5 to 100. Depending on the supply conditions, detection of a photon can give in repeatable manner between 5 and 100 electrons which enables the gain of the photodetector to be defined. The gain value varies according to the temperature of the detector. For a HgCdTe detector, the gain value increases when the temperature decreases. In advantageous manner, the biasing conditions are chosen in such a way as to have a gain comprised between 5 and 200 and more particularly between 10 and 150.

It is observed that it is possible to bias the photodetector in a bias range that is much higher than that which the readout circuit can withstand, i.e. much higher than the breakdown voltage of at least one transistor forming the readout circuit.

It is important not to reach the avalanche threshold as the device becomes incapable of associating the quantity of detected photons with a representative current or voltage signal.

Bias circuit 4 is configured to impose a first potential difference on the terminals of photodetector 1 during a first time period. Bias circuit 4 is advantageously electrically coupled to the terminals of photodetector 1. A first potential, for example a substrate potential $V_{SUB}$, is applied on the second terminal of photodetector 1. A second potential, for example a bias potential, is applied on the first terminal of photodetector 1 via a resistor R. Resistor R enables electric coupling between bias circuit 4 and photodetector 1.

During the first time period, the photodetector is biased. The resistor used is not designed to maintain biasing in case of detection of photons. The resistor is configured so as to protect the detection device in the case where the photodetector is short-circuited by preventing injection of an excess current into the substrate. In case of detection, a part of the signal is absorbed by bias circuit 4.

Resistor R has a first terminal electrically coupled to the first terminal of photodetector 1 and to capacitor 3. Resistor R has a second terminal electrically coupled to a voltage source 5 so that the electric charges can flow between bias circuit 4 and the photodetector by means of resistor R. Advantageously, voltage source 5 delivers a fixed potential.

Bias circuit 4 is thus electrically coupled to the second terminal of resistor R. Bias circuit 4 is configured to bias photodetector 1 during a first time period by means of resistor R.

Figure 3:
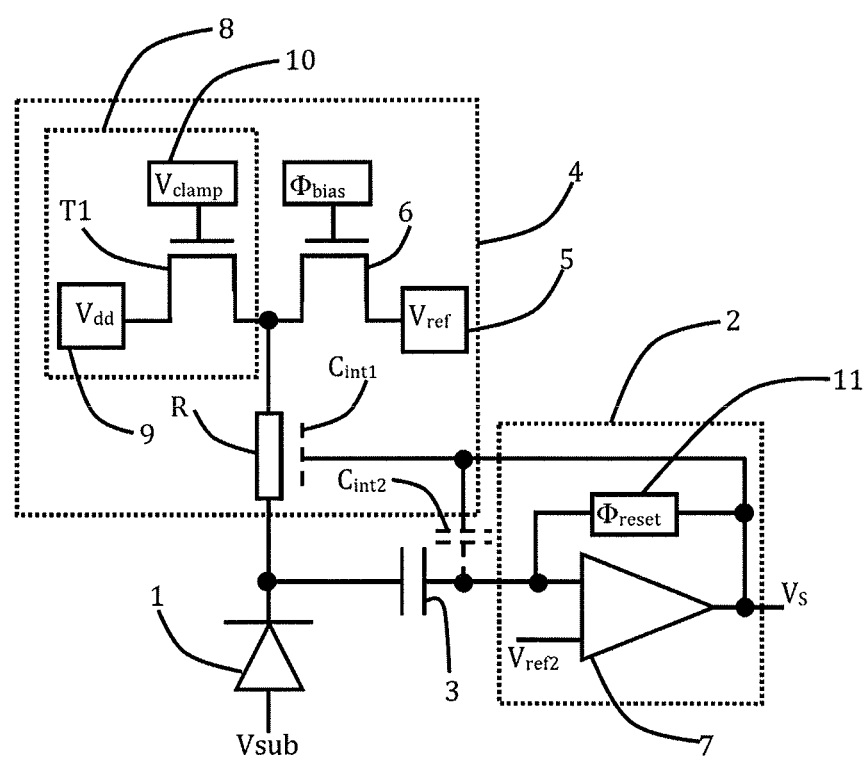
FIG. 3 represents a particular embodiment of a detection circuit according to the invention, in schematic manner.

In a particular embodiment illustrated in FIG. 3, the bias voltage $V_{REF}$ is applied by a voltage source 5 during the first period. Bias voltage $V_{REF}$ or a voltage resulting from the latter is applied on the first terminal of photodetector 1 through resistor R. The voltage applied on the second terminal enables the biasing conditions to be fixed. The voltage applied on the second terminal is for example a substrate voltage Vsub.

In a second time period, bias voltage $V_{REF}$ is no longer applied on photodetector 1. The first terminal of photodetector 1 is left at floating potential. Biasing of the photodetector is maintained by means of electric capacitances and in particular by means of the stray capacitance of photodetector 1. This embodiment is particularly easy to achieve with a photodiode as photodetector. In this case, the detected photons are transformed into electric charges which are integrated in capacitor 3. As the bias voltage is no longer applied on photodetector 1, it can be considered that an infinite resistance is placed in series with resistor R which enables detection of very weak signals without introduction of noise by bias circuit 4.

In an alternative embodiment also illustrated in FIG. 3, bias circuit 4 comprises a switch 6 connected between voltage source 5 and resistor R. Photodetector 1 is biased by voltage source 5 when switch 6 is in the closed state. Switch 6 is controlled by generation of the signal $\Phi_{bias}$. The signal $\Phi_{bias}$ controls opening and closing of the switch and therefore application of the bias voltage or not. In the first period, switch 6 is closed. During the second period, switch 6 is open. During the second period, voltage source 5 does not take part in biasing of photodetector 1.

Advantageously, switch 6 is a transistor and preferentially a field effect transistor.

In this configuration, during the second period, the current does not flow in resistor R, it is integrated in capacitor 3. Capacitor 3 transmits current information relative to the signal generated by photodetector 1. Readout circuit 2 therefore receives a current signal representative of the observed scene. The current emitted by photodetector 1 flows through capacitor 3.

In this configuration, a first voltage range can be present on one side of capacitor 3, for example in the part containing the photodetector. A second voltage range can be present on the other side of capacitor 3, for example in the part containing readout circuit 2. It is advantageous to apply a first bias to the terminals of the photodetector which is not correlated to a second bias applied to the terminals of readout circuit 2. The value of the first bias is fixed independently from the value of the second bias.

This type of circuit enables high voltages to be applied to the terminals of photodetector 1 while at the same time having weaker voltages at the terminals of readout circuit 2. It is then possible to combine a strongly biased photodetector to be sensitive to the incident radiation and a less strongly biased readout circuit so as to be sensitive to the electric signal received on input and to present a weak electronic noise.

In an advantageous embodiment, readout circuit 2 is an integrator readout circuit which comprises an integration capacitor $C_{int}$. The integration capacitor $C_{int}$ is arranged so as to store the electric charges emitted by photodetector 1. Advantageously, integration capacitor $C_{int}$ is connected in negative feedback to an amplifier 7.

A reset circuit 11 can be used to initialise integration capacitor $C_{int}$ by short-circuiting its electrodes. In advantageous manner, the short-circuit signal $\Phi_{reset}$ and the signal $\Phi_{bias}$ are linked. Advantageously, the two signals are configured to have resetting of the integration capacitor of the readout circuit when bias circuit 4 biases photodetector 1. For example, the two signals are synchronised, in phase or in phase opposition.

In a particularly advantageous embodiment, the electric capacitance of capacitor 3 is higher than the electric capacitance of the integration capacitor of readout circuit 2. In advantageous manner, the electric capacitance of capacitor 3 is at least twice as high as the electric capacitance of the integration capacitor of readout circuit 2. In a particularly advantageous embodiment, the electric capacitance of capacitor 3 is equal to 100 fF and the electric capacitance of integration capacitor $C_{int}$ is equal to 30 fF. The electric capacitance of capacitor 3 is preferably higher than the electric capacitance of the stray capacitor of the photodetector and even more preferably at least twice as high as the electric capacitance of this stray capacitor of the photodetector.

In a particular embodiment, readout circuit 2 is a transimpedance amplifier circuit which comprises an amplifier 7 with an integration capacitor $C_{int}$ connected in negative feedback manner as represented in FIG. 2.

In another particular embodiment which can be combined with the previous embodiments, readout circuit 2 is made on a first monoblock substrate made from semiconductor material which enables a compact, high-performance circuit to be easily produced. The substrate can be a bulk semiconductor substrate or the active layer of a semiconductor or insulator substrate. The same is advantageously the case for bias circuit 4 which can be fabricated on the same substrate as the readout circuit. The bias circuit and/or the readout circuit comprises a plurality of transistors which are formed in a substrate made from semiconductor material. These transistors are electrically isolated from one another by means of isolation patterns which sink into the semiconductor substrate. The isolation patterns are made from an electrically insulating material. The thickness of these isolation patterns is advantageously more than 50 nm and advantageously more than 100 nm.

The transistors of readout circuit 2 and/or of bias circuit 4 are made on the monoblock semiconductor material substrate and resistor R is made outside this substrate. Advantageously, resistor R is separated from the substrate by an electrically insulating layer. The electrically insulating layer is advantageously the layer used to form the isolation patterns. For example, resistor R is produced by means of a polysilicon pattern. This particular configuration makes it possible to produce in compact manner a resistor R that is electrically disconnected from the substrate, which enables it to withstand high voltages without risking a stray charge carrier transit inside the substrate. The configuration is compact as the resistor is produced on the same substrate as the other components. Comparing the embodiments described in the document FR 2857545, it is important to note that the electric disconnection between the resistor and the substrate forming the bias circuit and/or the readout circuit enables the high voltages applied on the avalanche linear photodetector and the lower voltages linked to readout circuit 2 to be well separated.

In an alternative embodiment which can be combined with the previous embodiments, readout circuit 2 is made on a monoblock semiconductor material substrate which enables a compact, high-performance circuit to be easily produced. The substrate can be a bulk semiconductor substrate or the active layer of a semiconductor on insulator substrate.

The transistors of readout circuit 2 are made on the monoblock semiconductor material substrate and capacitor 3 is made outside this substrate. Advantageously, capacitor 3 is separated from the substrate by an electrically insulating layer. For example, capacitor 3 is formed by means of two electrodes which are both formed by a semiconductor or metallic material which are separated from the substrate by an electrically insulating film. This particular configuration makes it possible to produce in compact manner a capacitor 3 that is electrically disconnected from the substrate which enables it to withstand high voltages without risking a stray charge carrier transit inside the substrate. The electrode of capacitor 3 in contact with photodetector 1 is separated from the substrate by an electrically insulating film. In an advantageous embodiment, the other electrode of the capacitor is formed in the substrate and possibly by a source/drain or gate electrode of one of the transistors forming the input terminal of the readout circuit.

The use of passive components fabricated outside the semiconductor substrate increases the reliability of separation between the high-voltage area applied on one side of capacitor 3 and the low-voltage area applied on the other side of capacitor 3, here in the semiconductor substrate. It is then possible to have, in one and the same circuit, a part of the components subjected to high voltages and another part of the components subjected to a weaker voltage while preventing stray charge carrier transfer via the substrate. The dielectric material present between the two electrodes of capacitor 3 prevents large current leaks.

This configuration enables the operating speed of readout circuit 2 and/or its sensitivity to be increased by offsetting its set of voltages with respect to the set of voltages applied to make photodetector 1 operate. Such a detection circuit can be made using CMOS technology, with the possible exception of the photodetector, which enables the electronic part of the circuit to the produced in simple and compact manner.

In a particularly advantageous embodiment, resistor R is arranged so as to form a stray capacitor $C_{int1}$ connected to readout circuit 2. This arrangement enables the conversion gain of integrator readout circuit 2 to be increased while reducing the noise. In more precise manner, resistor R can be arranged so as to form an electric capacitance $C_{int}$ provided with an electric connection connecting the input of amplifier 7 with the output of amplifier 7 to form an integration capacitor of readout circuit 2 through capacitor 3.

In a particular embodiment, the stray capacitor $C_{int1}$ is connected in negative feedback mode to the amplifier 7 of readout circuit 2. The second input of the amplifier can be connected to a voltage source which applies a reference voltage $V_{REF2}$. The reference voltage is then applied on an electrode of capacitor 3 and the bias voltage is applied on the other electrode. In this way, the reference voltage $V_{REF2}$ contributes to initialisation of the bias of capacitor 3 during the first period when switch 6 is in closed state.

In another particularly advantageous embodiment which can be combined with previous embodiments, capacitor 3 is arranged so as to form a stray capacitor $C_{int2}$ connected to readout circuit 2. This arrangement enables the conversion gain of integrator readout circuit 2 to be increased while at the same time reducing the noise.

In a particular embodiment, the stray capacitor $C_{int2}$ is connected in negative feedback to amplifier 7 of readout circuit 2.

In another particularly advantageous embodiment which can be combined with previous embodiments, a voltage clamping circuit 8 is connected to the second terminal of resistor R. Clamping circuit 8 is configured to clamp the voltage present on the second terminal of resistor R at a threshold value. In an even more particular embodiment, clamping circuit 8 is configured to deliver a negative-feedback current which clamps the voltage of the second terminal of resistor R at a threshold value.

The clamping circuit is particularly advantageous during the second time period. If the photodetector is short-circuited, clamping circuit 8 enables the current that is flowing to be limited which protects the readout circuit.

In a particular embodiment, clamping circuit 8 comprises an additional voltage source 9 electrically coupled to the second terminal of resistor R by means of an additional switch T1. Clamping circuit 8 is configured so that the additional voltage source 9 delivers a negative-feedback current when the additional switch T1 turns on. The additional switch T1 delivers a reverse-feedback current which enables the voltage of the second terminal of resistor R to be clamped when switch T1 turns on. Switching of switch T1 to closed state according to the voltage value present on the second terminal of resistor R can be achieved in different manners.

In a particularly advantageous embodiment as it is compact, switch T1 is a transistor. The control terminal of transistor T1 is connected to another voltage source 10 which applies the clamping voltage $V_{clamp}$. In this way, switching of transistor T1 between the off and on states is conditioned by the voltage difference that exists between the voltage present on the second terminal of resistor R and the clamping voltage $V_{clamp}$. It is the value of the clamping voltage $V_{clamp}$ which sets the threshold value. This advantageous configuration enables the amplitude of the voltage variations on the second terminal of resistor R to be limited. This specificity enables the readout circuit and/or the bias circuit to be protected in case of a too large voltage variation. Advantageously, the transistor is configured to operate in linear mode and not in switching mode.

It is particularly advantageous to form a radiation detector which comprises a plurality of detection circuits as described in the foregoing. However, at the fabrication method of the photodetectors is such that at least one malfunctioning photodetector always exists in a detector of large size. Radiation detectors using a large number of photodetectors are very difficult to produce as an electric fault present on a photodetector will cause failure of the photodetector matrix. The strong bias applied on the short-circuited photodetector will be present on all the readout circuits which are not configured to manage such bias levels. This type of problem is not dealt with in the architecture disclosed in the document FR2857545. It is in fact observed that the bias voltage of the photodetector derives from the bias voltage of the readout circuit and the readout circuit is therefore configured to withstand the bias voltage applied to the photodetector.

In the case where the detector is configured to detect weak fluxes, the photodetectors are all strongly biased. When a photodetector 1 presents a fault, a consequent current is applied in continuous or quasi-continuous manner to bias circuit 4 which can distort the bias conditions applied to the other photodetectors. The use of a resistor between photo-detectors 1 and readout circuits 2 enables the current that is able to flow to be reduced and the functionality of the other photodetectors to be preserved. In this configuration, it is possible to combine strongly biased photodetectors and readout circuits sensitive to unforeseeable events affecting the bias limiting the risks of damage to the readout circuit, for example in case of malfunctioning of the photodetector. Advantageously, the resistance value is higher than 100 kOhms which enables a wide range of operating conditions, for example between 100 kOhms and 1 MOhms, to be withstood.

The output terminal of the detection circuit is designed to be connected to an analysis circuit (not shown).

This type of detection circuit enables efficient measurement of good quality on light signals having a weak flux. This type of detection circuit is particularly well-suited for linear sub-photonic detection, i.e. for counting of photons.

The invention claimed is:

1. An electromagnetic radiation detection circuit comprising:
   a photodetector transforming a received electromagnetic radiation into an electric current,
   a readout circuit coupled to a first terminal of the photodetector, the readout circuit being configured to transform a current signal emitted by the photodetector into a voltage signal,
   a capacitor having a first terminal electrically coupled to the first terminal of the photodetector and a second terminal electrically coupled to the readout circuit,
   a bias circuit configured to
      bias the photodetector during a first time period by means of a first biasing condition,
      leave the first terminal of the photodetector at a floating potential in a second time period, the first biasing condition being configured to make the photodetector operates in linear avalanche manner during the second time period,
   a resistor having a first terminal electrically coupled to the bias circuit and a second terminal electrically coupled to the first terminal of the photodetector.

2. The circuit according to claim 1, wherein the readout circuit is formed in a first monoblock semiconductor material substrate and wherein the second terminal of the capacitor electrically coupled to the photodetector is formed in a semiconductor film separated from the first monoblock semi-conductor material substrate by a first electrically insulating film.

3. The circuit according to claim 2, wherein the bias circuit is formed in the first monoblock semiconductor material substrate and wherein the resistor is formed in a semiconductor film separated from the first monoblock semiconductor material substrate by a second electrically insulating film.

4. The circuit according to claim 3, wherein the bias circuit comprises at least two transistors formed in the first monoblock substrate and electrically isolated by means of an isolation pattern which sinks into the first substrate and wherein the resistor is formed on said isolation pattern.

5. The circuit according to claims 1, wherein the bias circuit comprises a switch connected between a voltage source and the resistor, the photodetector being biased by the voltage source when the switch is in the closed state during the first time period, the switch being in the off state during the second time period.

6. The circuit according to claim 1, wherein the readout circuit comprises an integration capacitor and a reset circuit configured to short-circuit the electrodes of the integration capacitor and wherein the electrodes of the integration capacitor are short-circuited during at least a part of the first time period.

7. The circuit according to claim 1, further comprising a clamping circuit configured to clamp the voltage present on the second terminal of the resistor at a threshold value during the second time period.

8. The circuit according to claim 7, wherein the clamping circuit comprises an additional voltage source electrically coupled to the second terminal of the resistor by means of an additional switch and configured in such a way that the additional voltage source delivers a negative feedback current when the additional switch turns on.

9. The circuit according to claim 8, wherein the additional switch is a transistor having a control electrode connected to a clamping voltage source.

10. The circuit according to claim 9, wherein the readout circuit comprises an amplifier having an input connected to the capacitor and an integration capacitor fitted in negative-feedback manner, the integration capacitor being at least partially formed by a stray capacitance of the resistor.

11. The circuit according to claim 1, wherein the readout circuit comprises an amplifier having an input connected to the capacitor and an integration capacitor fitted in negative feedback, the integration capacitor being at least partially formed by a stray capacitance of the capacitor.

12. The circuit according to claim 1, characterized in that the first bias condition is configured so as to be higher than the breakdown voltage of at least one transistor forming the readout circuit.

13. A detection device comprising a plurality of circuits according to claim 1 and organised to form a matrix detector.

* * * * *